United States Patent Office 3,701,757
Patented Oct. 31, 1972

3,701,757
ORTHOESTER CATALYSIS OF POLYESTER POLYCONDENSATION
Stanley David Lazarus, Petersburg, and Robert Alden Lofquist, Richmond, Va., assignors to Allied Chemical Corporation, New York, N.Y.
No Drawing. Filed Feb. 1, 1971, Ser. No. 111,730
Int. Cl. C08g *17/015*
U.S. Cl. 260—75 R
16 Claims

ABSTRACT OF THE DISCLOSURE

The preparation of linear high-molecular weight, film and fiber forming polyalkylene terephthalates, comprising reacting either by direct esterification or ester interchange an organic dicarboxylic acid and/or the lower alkyl ester thereof with a polyol having 2 to 10 carbon atoms per molecule to obtain the corresponding diglycol-ester intermediate and then condensing said intermediate in the presence of an effective amount of a condensation accelerator which is an orthoester of an organic acid which produces volatile alcohol and acid upon reaction with water.

BACKGROUND OF THE INVENTION

Field of the invention

This invention relates to film and fiber forming synthetic polyesters. More particularly, it relates to film and fiber forming synthetic polyesters and to the process for preparing them. Still more particularly, it relates to the preparation of film and fiber forming synthetic polyesters either by direct esterification or ester interchange of an organic dicarboxylic acid and/or the lower alkyl esters thereof with a glycol having 2 to 10 carbon atoms per molecule to obtain the corresponding diglycol-ester intermediate and then condensing said intermediate in the presence of an organic orthoester which produces volatile alcohol and acid upon reaction with water.

Description of the prior art

The preparation of linear high-molecular weight polyesters useful in commercial articles either by the ester interchange reaction between dimethyl terephthalate and a polyol or by a direct esterification process wherein a dicarboxylic acid is reacted with a polyol is known. U.S. Pat. 2,465,310 illustrates initial disclosure of the preparation of poly(ethylene terephthalate), and U.S. Pats. 3,050,-533, 3,018,272 and 3,484,410 illustrate various improvements thereof.

It is known in the art that the longer the time required to prepare a high molecular weight polyester from the prepolymer, the greater the quality of the polyester being prepared degrades, that is, the quality of the polyester is inversely related to the time required for the preparation of the polyester. Therefore, acceleration in condensing the prepolymer to a required viscosity level of final polymer would indeed make a notable and worthwhile contribution to this art.

A prime object of this invention is to prepare an improved film and fiber forming polyester.

Another object of this invention is to prepare films and fibers having better quality than heretofore.

A further object of this invention is to prepare an improved fiber and film forming polyester in a shorter period of time thus permitting better quality polymer in a shorter period of time. Other objects will become apparent in the course of the following detailed description.

SUMMARY OF THE INVENTION

In accordance with the above objects, a process has now been discovered for preparing linear high-molecular weight film and fiber forming polyalkyene terephthalates which comprises esterifying an aromatic dicarboxylic acid or a lower dialkyl ester thereof with an akylene gycol having 2 to 10 carbon atoms per molecule to obtain the corresponding diglycol-ester intermediate, condensing said intermediate at a temperature ranging from about 260° C. to about 310° C. with an effective amount of a condensation acceerator which is an orthoester of an organic acid which produces volatile alcohol and acid upon reaction with water.

In general, the direct esterification in accordance with this invention is carried out with the molecular ratio of the acid to the polyol of from about 1.0 to about 1.0–2.0 and preferably in a mole ratio of from about 1.0 to about 1.1–1.7. The process of this invention enables the use of an ethylene glycol, terephthalic acid ratio close to unity which avoids glycol wastes, thus allowing the process to enjoy quite favorable economics.

The direct esterification of the process of the invention may start as low as 200° C. and range up to about 310° C. It is carried out in the absence of oxygen and can be carried out at atmospheric or at elevated pressure. The amount of orthoester present during the condensation or polymerization step of the reaction ranges generally from about 0.10 to about 6.0 percent based on total moles of diester compounds present, and preferably from about 0.25 to 2.0 percent based on total moles of diester compounds. Other additives can be used without adverse effect in order to tailor or characterize the finished polymer as necessary in accordance with this invention. The condensation or polymerization is usually carried out at a reduced pressure which can be as low as 0.1 torr and a temperature of from about 260° C. to about 310° C. and for a period of time from about 1.5 to about 10 hours, and preferably from about 2 to about 6 hours until a polymerized polyester product of the requisite molecular weight, as determined by viscosity or other convenient physical measurement is obtained. The present invention illustrates that with the use of the orthoesters of this invention, in the condensation or polymerization part of the reaction, a higher viscosity can be obtained in the same reaction time or wherein a necessary viscosity level can be obtained in a shorter period of time.

The theory of how the present mechanism yields the condensation acceleration is not known; however, it is possible that one of these mechanisms or combinations thereof is being accomplished. First, it is possible that the orthoester of the organic acid acts as a water scavenger in accordance with the following reaction:

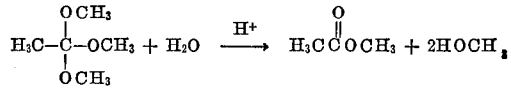

Second, it is possible that the mechanism functions as a chain extender in accordance with the following reaction:

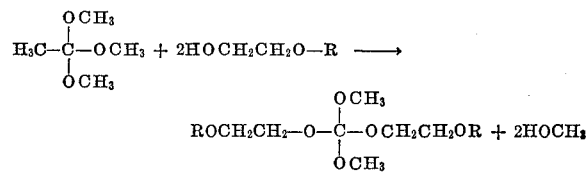

Third, it is possible that the mechanism acts as a gas generator, that is, it reacts with water present in the polymer and forms three to six volatile molecules per molecule of accelerator, naturally depending upon the accelerator used. The gas, in this instance creates bubbles within the melt, adding to the liquor-vapor interface and increasing the area across which water and glycol can volatilize.

This further volatilization of water and glycol permits further condensation reaction within the polymer melt.

The following examples illustrate the effectiveness of the invention.

EXAMPLE 1

Fifty grams of polyethylene terephthalate of 0.6 intrinsic viscosity is placed in a 500 ml. flask, and the flask partially submerged in a molten salt bath at 240° C. The flask contains two stainless steel balls of about ½" diameter to provide agitation of the melt as the flask is rotated in the salt bath. The pressure on the melt is reduced to about 0.5 torr pressure, and the temperature is raised to about 290° C. over a period of one hour.

The vacuum is broken and 0.5 gram of triethyl orthoacetate is added to the flask. Then the pressure is reduced to about 0.5 torr and the flask is agitated for another 15 minutes. Then the polymer is cooled and removed from the flask. The polymer shows the following physical characteristics upon analyiss: An intrinsic viscosity of 0.85, a carboxyl content of 18 milliequivalents per kilogram and a diethylene glycol content of 0.89 weight percent.

EXAMPLE 2

The above example is repeated except that upon breaking the vacuum, nothing is added. The polymer is removed and analyzed. The intrinsic viscosity is 0.77, the carboxyl content is 22 milliequivalents per kilogram and the diethylene glycol content is 0.83 weight percent.

EXAMPLE 3

Example 1 is repeated except for substituting 0.5 gram of diphenyl carbonate. The polymer analysis shows an intrinsic viscosity of 0.83, a carboxyl content of 19 milliequivalents per kilogram and a ethylene glycol content of 0.88 weight percent.

EXAMPLE 4

Example 1 is repeated except with 0.5 gram of triethyl orthoformate. The polymer analysis shows an intrinsic viscosity of 0.84, a carboxyl content of 16 milliequivalents per kilogram and a diethylene glycol content of 0.87 weight percent.

EXAMPLE 5

Example 2 is repeated except with 0.75 gram of tributyl orthoformate. The polymer analysis shows an intrinsic viscosity of 0.83, a carboxyl content of 19 milliequivalents per kilogram and a diethylene glycol content of 0.83 weight percent.

EXAMPLE 6

Example 1 is repeated except with 2.0 grams of triethyl orthoformate. The polymer analysis shows an intrinsic viscosity of 0.90, a carboxyl content of 15 milliequivalents per kilogram, and diethylene glycol content of 0.98 weight percent.

EXAMPLE 7

Example 1 is repeated except with 0.5 gram of hexamethyl orthoadipate. The polymer analysis shows an intrinsic viscosity of 0.82, a carboxyl content of 19 milliequivalents per kilogram, and a diethylene glycol content of 0.81 weight percent.

EXAMPLE 8

Example 1 is repeated but with 0.5 gram diphenyl terephthalate instead of triethyl orthoacetate. The polymer analysis shows an intrinsic viscosity of 0.77, a carboxyl content of 21 milliequivalents per kilogram and a diethylene glycol content of 0.96 weight percent.

These examples illustrate that a higher viscosity change is obtained utilizing the orthoesters of this invention in an equivalent time where heretofore these viscosity levels were not obtained within this period of time.

EXAMPLE 9

Sixty pounds per hour terephthalic acid, thirty-four pounds per hour ethylene glycol and 0.18 pound per hour di-isopropylamine are metered to a paddle mixer where they are converted to a paste and pumped toward a heat exchanger. Prior to reaching the heat exchanger, the paste is mixed with a portion of esterified product from the first of two esterification reaction vessels in the ratio of 1 part paste to 35 parts esterified product. The solution of acid, glycol and esterified product resulting from the above-mentioned mixture is heated to 270° C. in the heat exchanger and pumped into the first esterification reactor which is maintained at 270° C. and a pressure of 90 p.s.i.g. Average product residence time in this reactor is 60 minutes. As previously mentioned, a portion of the product of this esterification reactor is recirculated and mixed with fresh paste. About 3% of the product, however, is conveyed to a second esterification reactor operating at 270° C. and a pressure of 2 p.s.i.g. Once again, the product residence time is 60 minutes in the second esterification reactor. The product is then pumped to the first of three agitated polycondensation vessels. In this reactor the product reacts for 90 minutes at 280° C. and a pressure of 75 torr and at exit is found to have an intrinsic viscosity of 0.19.

The product is further reacted in the second polycondensation reactor for 2 hours at 282° C. and a pressure of 1 torr after which it has an intrinsic viscosity of 0.60. Finally, the product is reacted in the third polycondensation vessel for 2 hours at 285° C. and a pressure of 0.5 mm. This final product has an intrinsic viscosity of 1.00. It is conveyed to a spin block, pumped through a 192 hole spinnerette, drawn at a ratio of 6.0 to 1 over heated rolls to produce a 1300 denier, 192 filament tire yarn having a tenacity of 9.1 g.p.d. Attempts to increase the throughput rate through this continuous polymerization system have led to a reduced intrinsic viscosity in the product leaving the final polycondensation reactor.

EXAMPLE 10

Seventy-eight pounds per hour terephthalic acid, forty-four pounds per hour ethylene glycol and 0.23 pound per hour di-isopropylamine are metered into the continuous polymerization system described in the last example. In order to obtain products equivalent to those in the last example at equivalent processing stages, the following process conditions are maintained:

| | Temp., °C. | Pressure | Residence time (min.) |
|---|---|---|---|
| 1st esterification reactor | 278 | 100 p.s.i.g. | 42 |
| 2nd esterification reactor | 278 | 2 p.s.i.g. | 42 |
| 1st polycondensation reactor | 287 | 75 torr | 63 |
| 2nd polycondensation reactor | 290 | 1 torr | 84 |
| 3rd polycondensation reactor | 285 | 2 torr | 84 |

In addition, 0.5 pound per hour of triethyl ortho acetate in a 50% solution with tris-nonylphenyl phosphite is mixed with the 3rd polycondensation reactor feed stock by means of an in-line mixer located at the point at which the feed line enters the reactor. The triethyl ortho acetate feed line is cooled to prevent vaporization of the liquid prior to its mixing with the polymer. The intrinsic viscosity of the product leaving the second reactor is 0.60 and although the third polycondensation reactor is operated at higher pressure, the same temperature and shorter residence time, the product leaving this final reactor still has an intrinsic viscosity of 1.00.

Example 10 compared with Example 9, illustrates obtaining a high viscosity polymer over a shorter period of time.

We claim:

1. A process for preparing high molecular weight film and fiber forming polyalkylene terephthalates which comprises esterifying an aromatic dicarboxylic acid or a lower dialkyl ester thereof with an alkylene glycol in a molecular ratio of acid to glycol of from about 1.0 to about 1.0–2.0 and having 2 to 10 carbon atoms per molecule to obtain the corresponding diglycol-ester intermediate, condensing said intermediate at a temperature ranging from about 260° C. to about 310° C. with an effective amount of a condensation accelerator which is an orthoester of an organic acid which produces volatile alcohol and acid upon reaction with water.

2. The process according to claim 1 wherein the orthoester of an organic acid is selected from the group consisting of trimethyl, triethyl, tripropyl, triisopropyl, tributyl, triisobutyl and triamyl orthoesters of formic, acetic, oxalic, succinic and adipic acids.

3. The process according to claim 1 wherein the temperature of the condensation is maintained at a temperature between about 260° C. and 300° C. and the pressure is maintained between about 0.1 and about 10 torr.

4. The process according to claim 1 wherein the aromatic dicarboxylic acid is selected from the group consisting of terephthalic acid, isophthalic acid and naphthalene dicarboxylic acids.

5. The process according to claim 1 wherein the alkylene glycol is ethylene glycol.

6. The process according to claim 1 wherein the aromatic dicarboxylic acid is terephthalic acid, the alkylene glycol is ethylene glycol and the orthoester is triethyl orthoacetate.

7. The process according to claim 1 wherein the condensation of the diglycol-ester intermediate takes place in the presence of about 0.1 to about 6.0 mole percent of the orthoester based on the weight of the polymer.

8. The process according to claim 1 wherein the condensation of the diglycol-ester intermediate takes place in the presence of about 0.25 to about 2.0 mole percent of the orthoester based on the weight of the polymer.

9. A process for preparing linear high-molecular weight film and fiber forming polyalkylene terephthalates which comprises esterifying an aromatic dicarboxylic acid or a lower dialkyl ester thereof with an alkylene glycol having 2 to 10 carbon atoms per molecule to obtain the corresponding diglycol-ester intermediate, condensing said intermediate at temperatures ranging from about 260° C. to about 300° C. with an effective amount of a condensation accelerator of an orthoester of an organic acid of the formula:

$$(H)_q(CH_2)_n[C(O\{CH_2\}_mH)_3]_p$$

wherein:
$n = 0$–$4$,
$m = 1$–$5$,
$p = 1$ or $2$,
$q = 1$ or $0$, and
$p + q = 2$ which upon reaction with water produces a volatile alcohol and a volatile acid.

10. The process according to claim 9 wherein the orthoester of an organic acid is selected from the group consisting of trimethyl, triethyl, tripropyl, triisopropyl, tributyl, triisobutyl, and triamyl orthoesters of formic, acetic, oxalic, succinic and adipic acids.

11. The process according to claim 9 wherein the temperature of the condensation is maintained at a temperature between about 210° C. and 300° C. and the pressure is maintained between about 0.1 and about 1.0 torr.

12. The process according to claim 9 wherein the aromatic dicarboxylic acid is selected from the group consisting of terephthalic acid, isophthalic acid and naphthalene dicarboxylic acids.

13. The process according to claim 9 wherein the alkylene glycol is ethylene glycol.

14. The process according to claim 9 wherein the aromatic dicarboxylic acid is terephthalic acid, the alkylene glycol is ethylene glycol and the orthoester is triethylorthoacetate.

15. The process according to claim 9 wherein the condensation of the diglycol-ester intermediate takes place in the presence of about 0.1 to about 6.0 mole percent of the orthoester based on the weight of the polymer.

16. The process according to claim 9 wherein the condensation of the diglycol-ester intermediate takes place in the presence of about 0.25 to about 2.0 mole percent of the orthoester based on the weight of the polymer.

References Cited

Kroehnke et al., Ann. 669, 52–54 (1963).

MELVIN GOLDSTEIN, Primary Examiner